United States Patent
Yang et al.

(10) Patent No.: US 7,126,923 B1
(45) Date of Patent: Oct. 24, 2006

(54) METHOD AND SYSTEM FOR INTER-DOMAIN LOOP PROTECTION USING A HIERARCHY OF LOOP RESOLVING PROTOCOLS

(75) Inventors: Xuguang Yang, Sunnyvale, CA (US); Prakash Kashyap, Cupertino, CA (US)

(73) Assignee: Extreme Networks, Inc., Santa Clara, CA (US)

( * ) Notice: Subject to any disclaimer, the term of this patent is extended or adjusted under 35 U.S.C. 154(b) by 1049 days.

(21) Appl. No.: 10/172,487

(22) Filed: Jun. 13, 2002

Related U.S. Application Data (63) Continuation of application No. 10/157,568, filed on May 28, 2002, now abandoned.

(51) Int. Cl.
*H04L 12/28* (2006.01)

(52) U.S. Cl. ...................... 370/256; 370/401
(58) Field of Classification Search ............... 370/256, 370/401, 404–406, 408
See application file for complete search history.

(56) References Cited

U.S. PATENT DOCUMENTS

| | | | | |
|---|---|---|---|---|
| 4,706,080 | A  * | 11/1987 | Sincoskie | 340/825.02 |
| 6,515,969 | B1 * |  2/2003 | Smith | 370/256 |
| 6,535,491 | B1 * |  3/2003 | Gai et al. | 370/256 |
| 6,813,250 | B1 * | 11/2004 | Fine et al. | 370/256 |
| 6,898,189 | B1 * |  5/2005 | Di Benedetto et al. | 370/256 |
| 6,937,576 | B1 * |  8/2005 | Di Benedetto et al. | 370/256 |
| 6,963,575 | B1 * | 11/2005 | Sistanizadeh et al. | 370/404 |
| 6,987,740 | B1 * |  1/2006 | Di Benedetto et al. | 370/256 |
| 2002/0052936 | A1 * |  5/2002 | Gai et al. | 709/220 |
| 2002/0147800 | A1 * | 10/2002 | Gai et al. | 709/221 |
| 2005/0259597 | A1 * | 11/2005 | Benedetto et al. | 370/254 |
| 2006/0092862 | A1 * |  5/2006 | Benedetto et al. | 370/256 |

OTHER PUBLICATIONS

U.S. Appl. No. 10/163,179, titled System and Method for a Virtual Local Area Network to Span Multiple Loop Free Network Topology Domains filed Jun. 3, 2002 inventors Merchant et al. Application pending.

U.S. Appl. No. 09/999,796, titled Ethernet Automatic Protection Switching filed Oct. 31, 2001 inventorsYip et al. Application Pending.

* cited by examiner

*Primary Examiner*—Chau Nguyen
*Assistant Examiner*—Hong Sol Cho
(74) *Attorney, Agent, or Firm*—Blakely, Sokoloff, Taylor & Zafman, LLP (57) ABSTRACT

A method and system is provided for inter-domain loop protection using a hierarchy of loop resolving protocols. The method includes receiving messages from inter-domain switches. The inter-domain switches belong to a plurality of loop-free network topology domains. A logical domain is abstracted that includes the inter-domain switches and logical links that connect the switches. Each logical link represents one of the physical loop free network topology domains that the inter-domain switches belong to. Then, the loops in the logical domain are eliminated. One or more logical links and ports associated with those logical links may be blocked to break the loops. This provides for a network free of inter-domain loops.

23 Claims, 6 Drawing Sheets

METHOD AND SYSTEM FOR INTER-DOMAIN LOOP PROTECTION USING A HIERARCHY OF LOOP RESOLVING PROTOCOLS

The present patent application is a Continuation of prior application Ser. No. 10/157,568, filed May 28, 2002 now abandoned.

BACKGROUND

1. Technical Field

The invention relates to the field of loop free network topology domains. In particular, the invention relates to inter-domain loop protection using a hierarchy of loop resolving protocols.

2. Background Information and Description of Related Art

A virtual local area network (VLAN) restricts communication between computers in a network on some network administrator defined basis rather than, for example, the physical location of the computers. The computers in the VLAN communicate with each other as if they are connected to the same local area network (LAN) segment even though they may actually be physically located on different segments of an internetwork. Conversely, computers connected to the same network segment may not necessarily be able to communicate with each other if, for example, they belong to different VLANs.

Networks, such as LANs, are often partitioned into separate segments to increase network performance. Bridges or switches connect the segments. A LAN may include redundant bridges and paths to provide backup in the event of a bridge or path failure in the LAN. The Spanning Tree Protocol (STP), part of the Institute of Electrical and Electronics Engineers (IEEE) 802.1D standard, authored and published by the IEEE Standards Association in June 1998, comprises an algorithm that provides for this redundancy while preventing undesirable loops in the LAN. Using the algorithm, bridges select a root bridge, and calculate and select a single path to the root bridge when faced with multiple redundant paths. After path costs are calculated and a single path is selected, the bridges block the redundant links.

There are other algorithms that prevents undesirable loops in a network. For example, the Ethernet Automatic Protection Switching Protocol (EAPS) prevents loops in a Layer-2 (L2) network having a ring topology. In the EAPS system, there is a master node linked to at least one transit node in a ring network. Each node has a primary port and a secondary port. During normal operation, the master node blocks data traffic from traversing its secondary port. During a network failure, the master node reroutes data traffic through its secondary port. Thus, similar to STP, EAPS blocks ports to prevent loops and provide a loop free domain.

These algorithms have been modified in different ways to further accommodate VLANs. For example, the IEEE 802.1Q standard, authored and published by the IEEE Standards Association in March 1999, specifies a single STP instance for all VLANs while another approach provides for a separate STP instance for each VLAN. Yet another approach contemplates one or more STP instances for one or more VLANs. Thus, an STP instance or STP domain (STPD) may span multiple VLANs, or a single VLAN may encompass multiple STPDs.

Similarly, other algorithms, such as EAPS provide for a domain to span multiple VLANs, or a single VLAN to encompass multiple loop free domains. However, one problem with multiple loop free domains is the possibility of inter-domain loops through the switches that are members of more than one loop free domain, since algorithms, such as STP and EAPS, only guarantees a loop-free topology inside each domain. Furthermore, a network, such as a VLAN, may contain different types of loop free domains with the possibility of inter-domain loops through switches that are members of more than one type of loop free domain.

SUMMARY

According to one aspect of the invention, a method and system is provided for inter-domain loop protection using a hierarchy of loop resolving protocols. The method includes receiving messages from inter-domain switches. The inter-domain switches belong to a plurality of physical loop-free network topology domains. A logical domain is abstracted that includes the inter-domain switches and logical links that connect the switches. Each logical link represents one of the physical loop free network topology domains to which the inter-domain switches belong. One or more logical links and ports associated with those logical links may be blocked to break any loops. Thus, the loops in the logical domain are eliminated.

According to one aspect of the invention, apparatus are provided to carry out the above and other methods.

BRIEF DESCRIPTION OF DRAWINGS

The invention may best be understood by referring to the following description and accompanying drawings that are used to illustrate embodiments of the invention. In the drawings.

DETAILED DESCRIPTION

Embodiments of a system and method for inter-domain loop protection using a hierarchy of loop resolving protocols are described. In the following description, numerous specific details are set forth. However, it is understood that embodiments of the invention may be practiced without these specific details. In other instances, well-known circuits, structures and techniques have not been shown in detail in order not to obscure the understanding of this description.

Reference throughout this specification to "one embodiment" or "an embodiment" means that a particular feature, structure, or characteristic described in connection with the embodiment is included in at least one embodiment of the invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
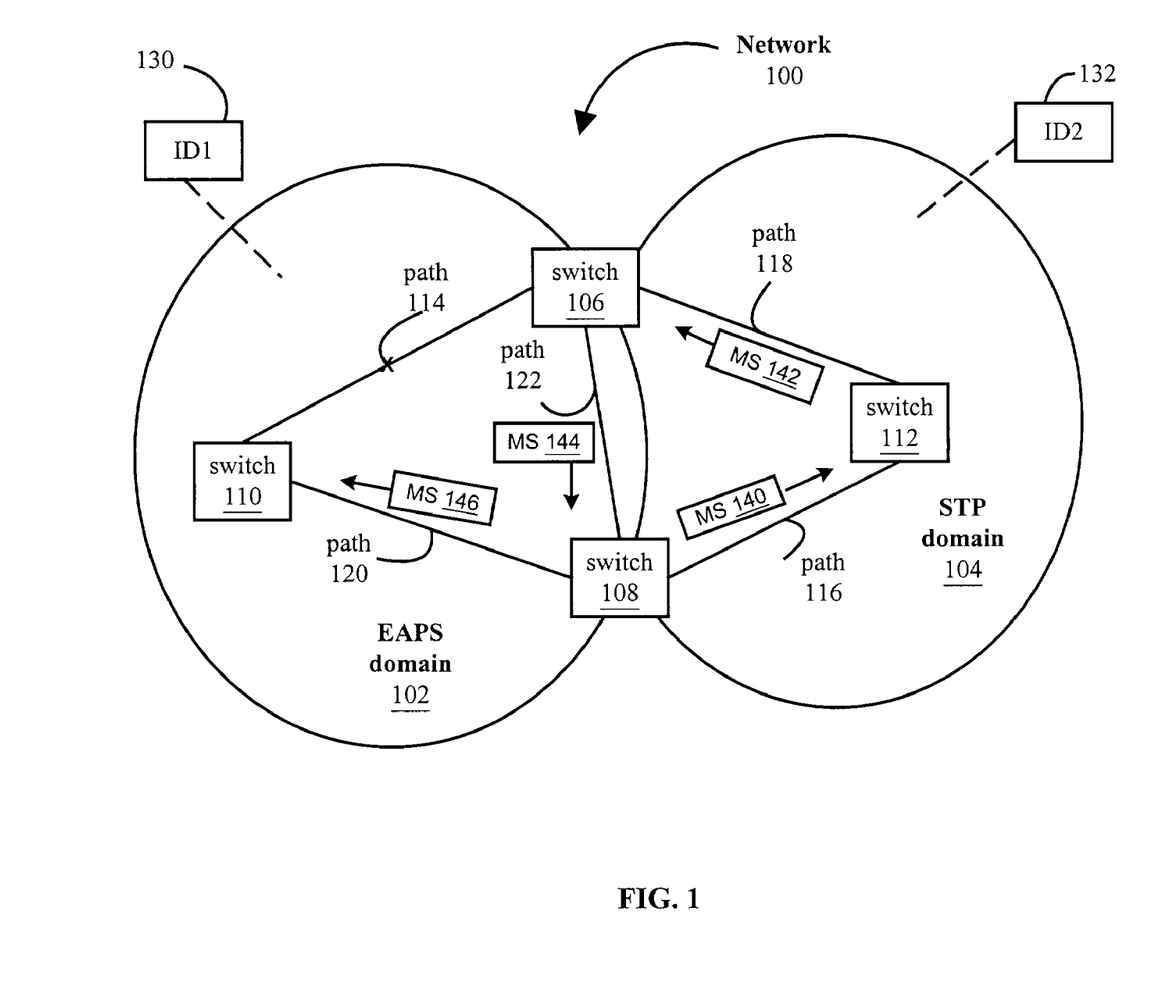
FIG. 1 illustrates an example of a network implementing one embodiment of the invention.

Referring to FIG. 1, a block diagram illustrates a network 100 according to one embodiment of the invention. Those of ordinary skill in the art will appreciate that the network 100 may include more components than those shown in FIG. 1. However, it is not necessary that all of these generally conventional components be shown in order to disclose an illustrative embodiment for practicing the invention.

Network 100 contains at least two loop-free network topology domains 102 and 104. Network 100 may contain one or more virtual local area networks (VLANs) that span one or more of the loop-free network topology domains. The loop-free network topology domains contain one or more switches. For example, loop-free domain 102 contains switches 106, 108, and 110, and loop-free domain 104 contains switches 106, 108, and 112. Each loop-free network topology domain may be assigned an identification number (ID). For example, domain 102 has been assigned ID1 (130) and domain 104 has been assigned ID2 (132).

In one embodiment, one or more of the loop-free domains are maintained loop-free in accordance with a Spanning Tree Protocol (STP). For example, suppose loop-free domain 104 is a STP domain. In this case, the STP algorithm running in domain 104 will break any loops within domain 104 by blocking one or more paths. Since there are only two paths in domain 104, path 116 and path 118, there are no loops within domain 104. Therefore, no path needs to be blocked.

In one embodiment, one or more of the loop-free domains are maintained loop-free in accordance with an Ethernet Automatic Protection Switching Protocol (EAPS). For example, suppose domain 102 is running EAPS. EAPS will break any loops within domain 102 by blocking one or more paths. Domain 102 contains three paths 114, 120, and 122 that create a loop. Therefore, EAPS will block one of the paths to eliminate the loop. For example, EAPS may block path 114. After path 114 is blocked, data may still be forwarded to all three switches 106, 108, and 110 through paths 120 and 122.

The protocols running in each domain ensure a loop-free topology inside the domain. However, there may still be inter-domain loops through the switches that are part of more than one domain. For example, switches 106 and 108 are inter-domain switches belonging to domains 102 and 104. STP ensures a loop-free topology within domain 104. EAPS ensures a loop-free topology within domain 102. However, there is still an inter-domain loop through switches 106, 108 and 112 formed by paths 116, 118 and 122. Since path 114 has already been blocked by EAPS running in domain 102, there is no loop formed by paths 120, 122, and 114.

Figure 2:
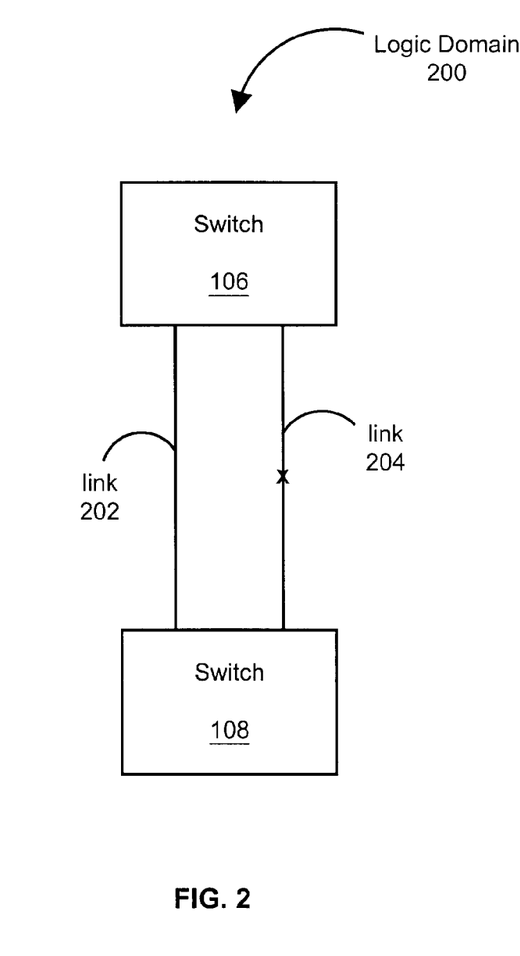
FIG. 2 illustrates an example of a logic domain according to an embodiment of the invention.

Referring to FIG. 2, an example of a logical domain according to one embodiment of the invention is shown. In order to break any inter-domain loops, a logical domain 200 is abstracted from the physical topology. The logical domain 200 contains only inter-domain switches connected by logical links. Each logical link represents one physical loop-free network topology domain. For example, switches 106 and 108 belong to two physical loop-free topology domains 102 and 104. Therefore, two logical links will be abstracted from the two physical loop-free domains. Logical link 202 represents loop-free domain 102, and logical link 204 represents loop-free domain 104.

After logical domain 200 is abstracted, one or more logical links in the logical domain will be blocked to break any loops within the logical domain. As an example, logical links 202 and 204 form a loop within logical domain 200. Therefore, one of the logical links will be blocked to break the loop. When there is more than one logical link that may be blocked to break a loop, a predetermined criteria is used to determine which logical link to block. In one embodiment, each loop-free domain is assigned an identification number (ID). When more than one logical link may be blocked to break a loop, the logical link representing the domain with the highest or lowest ID will be blocked. For example, domain 102 has been assigned ID1 and domain 104 has been assigned ID2. Therefore, when a predetermined criteria has been set to block the domain with the highest ID, domain 104 would be blocked. Since logical link 204 represents domain 104, logical link 204 is blocked.

In one embodiment, any loops are eliminated by running STP on the logical domain. This STP instance is conceptually running on top of the loop resolving protocol instances, such as STP instances, inside each physical loop free network topology domain creating a two-level protocol structure. Other protocols that eliminate undesirable loops, such as EAPS and Extreme Standby Router Protocol (ESRP), may be run on the logical domain.

Figure 3:
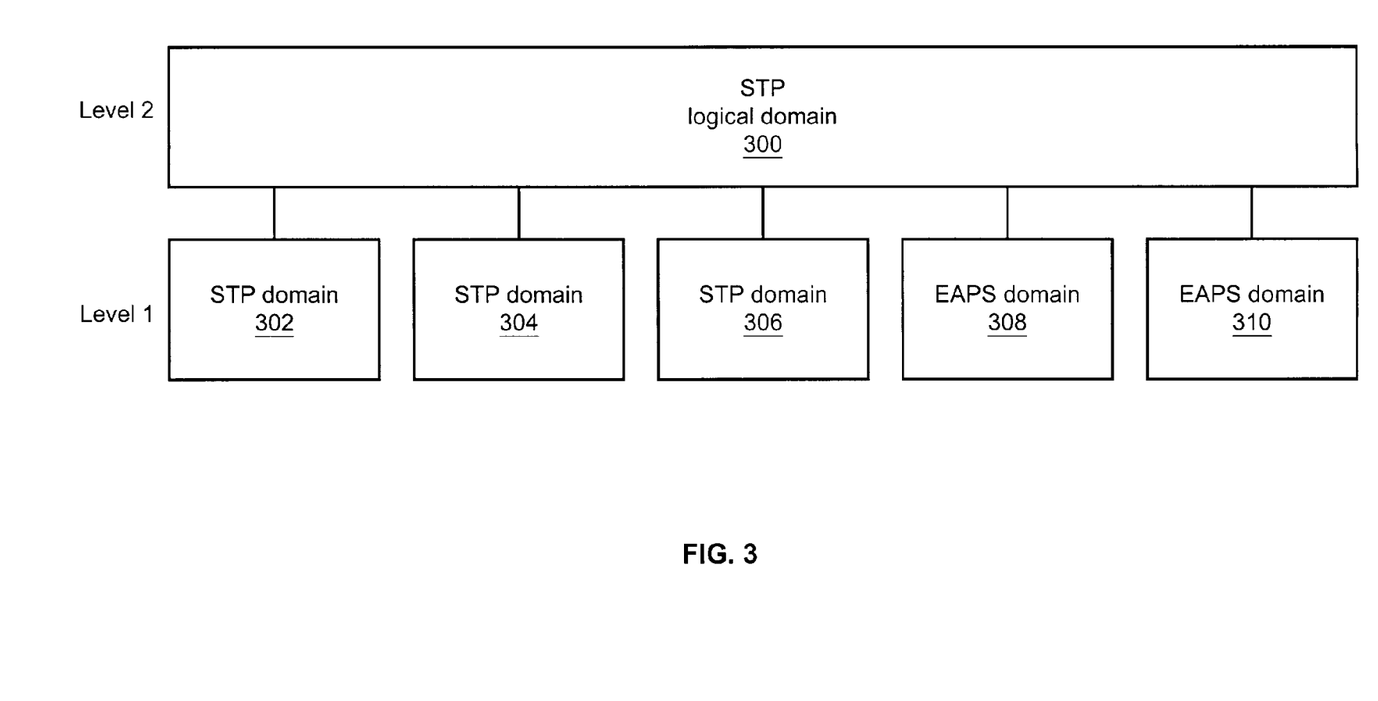
FIG. 3 illustrates an example of a hierarchy of loop resolving protocols according to one embodiment of the invention.

FIG. 3 illustrates an example of the hierarchy of loop resolving protocols according to one embodiment of the invention. As shown, a STP instance 300 is running on the logical domain on top of the STP instances 302, 304 and 306 and EAPS instances 308 and 310 running inside each of the physical loop-free network topology domains, creating a two-level protocol structure. Messages for the logical domain are generated, received, and processed only by the inter-domain switches and are flooded in the physical loop-free network topology domains during transmission to determine the logical ports to be blocked.

Figure 4:
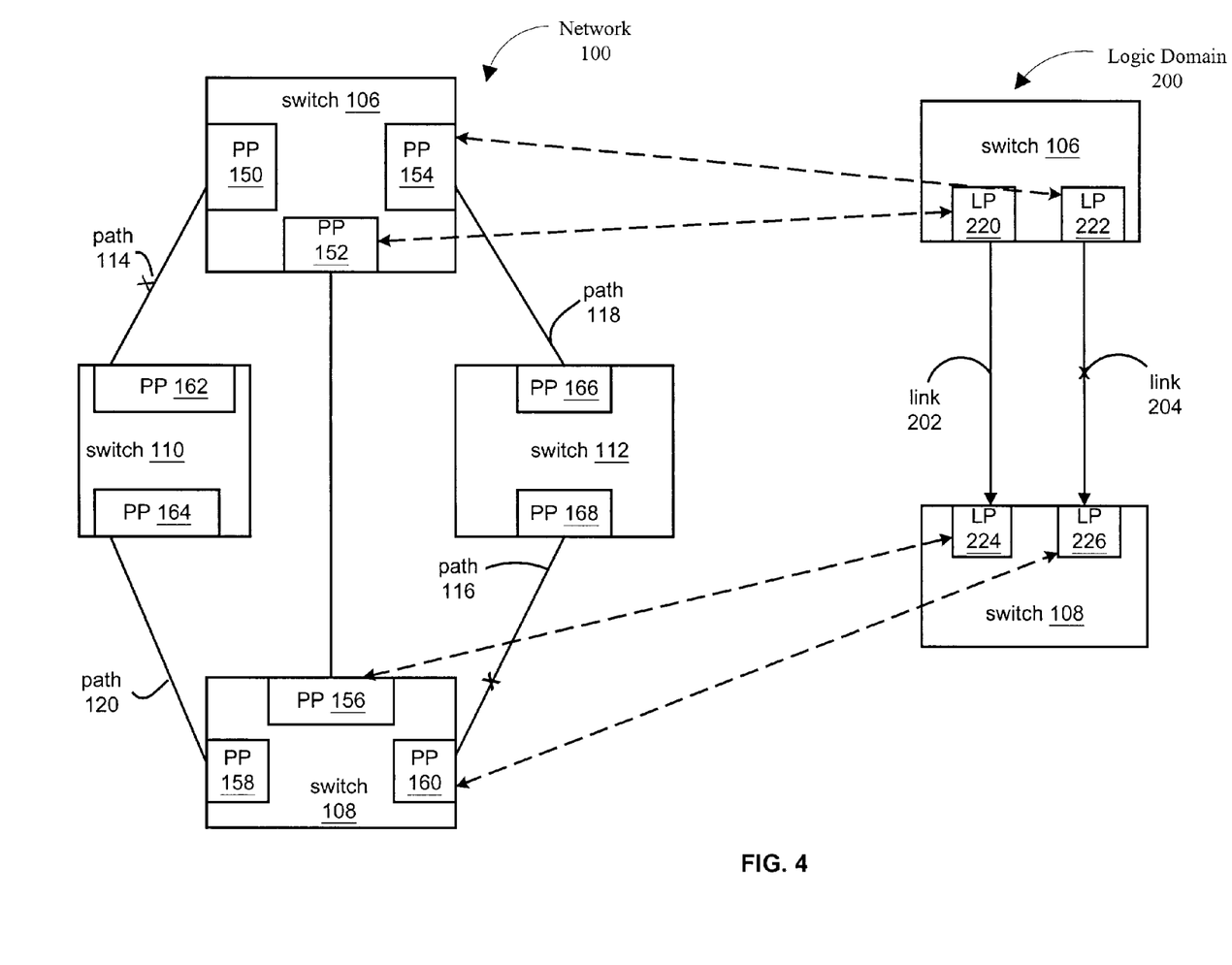
FIG. 4 illustrates the mapping of logical ports in the logical domain to physical ports in the network according to one embodiment of the invention.

FIG. 4 illustrates the mapping of logical ports in the logical domain to physical ports in the network according to one embodiment of the invention. Each switch in a loop-free domain contains one or more physical ports (PP). For example, switch 106 contains physical ports 150, 152, and 154, switch 108 contains physical ports 156, 158, and 160, switch 110 contains physical ports 162 and 164, and switch 112 contains physical ports 166 and 168. Each switch in the logical domain contains one or more logical ports (LP). For example, switch 106 contains logical ports 220 and 222, and switch 108 contains logical ports 224 and 226.

During abstraction of the logical domain, each logical port is mapped to a physical port of the same domain (shown by dotted lines in FIG. 3). When there is more than one physical port of the same domain that a logical port could potentially be mapped to, the mapping is determined by the unique forwarding path from the inter-domain switch that the logical port belongs to a connecting inter-domain switch. For example, switch 106 has two logical ports 220 and 222 and three physical ports 150, 152, and 154. Ports 150, 152, and 220 belong to loop-free domain 102, and ports 154 and 222 belong to loop-free domain 104. Since each logical port can only map to a physical port belonging to the same loop-free domain, logical port 222 can only map to physical port 154. Logical port 220 could potentially map to physical port 150 or physical port 152. However, path 114 has been blocked by EAPS running in loop-free domain 102. Therefore, the forwarding path from inter-domain switch 106 to inter-domain switch 108 is through port 152. Logical port 220 is therefore mapped to physical port 152. By the same reasoning, logical port 224 is mapped to physical port 156, and logical port 226 is mapped to physical port 160.

In order to block one or more logical links in the logical domain to break any loops, the corresponding logical port is blocked. Then, the logical port is mapped back to a physical port in the network, and the corresponding physical port is blocked. For example, suppose that STP determines that logical link 204 should be blocked to break the loop in logical domain 200. Logical port 226 corresponds to logical link 204, so logical port 226 is blocked in order to block logical link 204. Logical port 226 maps to physical port 160, so physical port 160 is blocked. By blocking physical port 160, path 116 is blocked, so there is no longer a loop through paths 122, 118, and 116. Therefore, there are no longer any inter-domain loops in network 100.

Figure 5:
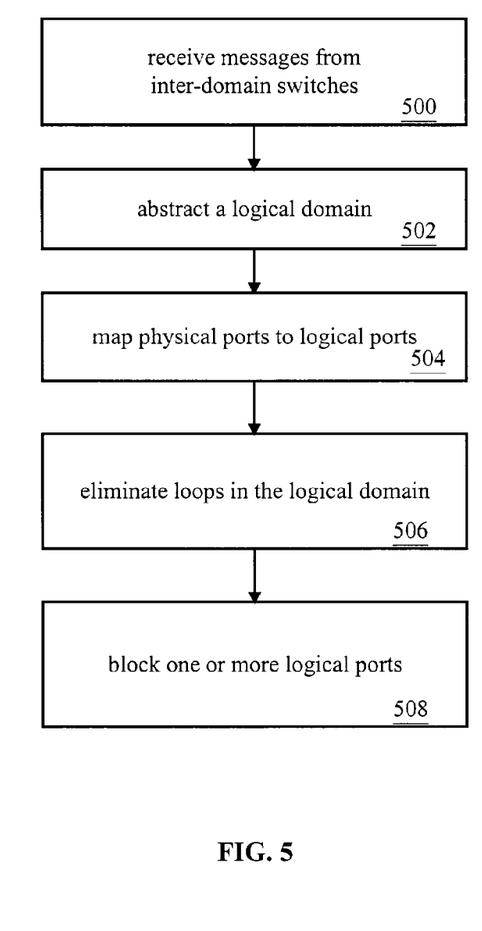
FIG. 5 is a flow diagram illustrating a method according to an embodiment of the invention.

Referring to FIG. 5, a method according to one embodiment of the invention is shown. At 500, messages are received from inter-domain switches. In one embodiment, the messages are flooded through the physical loop-free network topology domains to determine the logical ports to be blocked. At 502, a logical domain is abstracted from the inter-domain switches and logical links connecting the inter-domain switches. In one embodiment, each abstracted logical link represents one of the multiple domains that the inter-domain switches belong to. In one embodiment, at 504, each logical port in the logical domain is mapped to a physical port associated with the same inter-domain switch and loop-free network topology domain. If there is more than one physical port that can map to the logical port, the mapping may be determined by the unique forwarding paths from the inter-domain switch that the logical port belongs to a connecting inter-domain switch.

Then, at 506, loops formed by logical links in the logical domain are eliminated. One or more logical links are blocked to break the loops. In one embodiment, loops are eliminated by running STP in the logical domain. STP selects a single path for continued transmission of data and blocks all other redundant paths to prevent undesirable loops within the logical domain. Other protocols that eliminate loops in a domain, such as EAPS and ESRP may be run in the logical domain. At 508, the logical links are blocked by blocking the logical ports associated with the logical links. When more than one logical link may be blocked in order to break a loop, a predetermined criteria is used to determine which logical link to block. In one embodiment, each loop-free domain is assigned an ID, and the logical link representing the domain with the highest or lowest ID is blocked.

Figure 6:
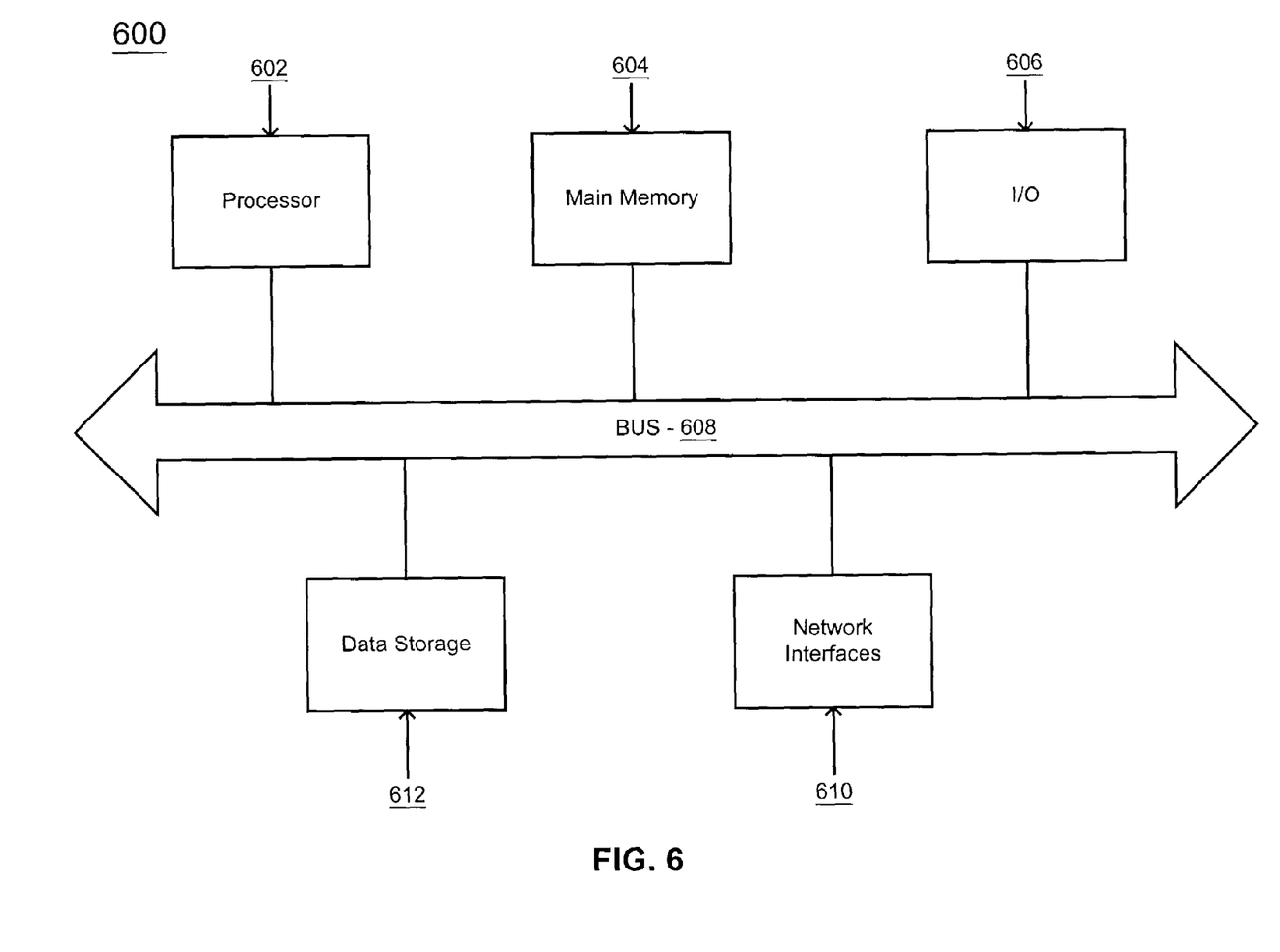
FIG. 6 is a block diagram illustrating a suitable computing environment in which certain aspects of the illustrated invention may be practiced.

FIG. 6 is a block diagram illustrating a suitable computing environment in which certain aspects of the illustrated invention may be practiced. In one embodiment, the method of the invention may be implemented on a computer system 600 having components 602–612, including a processor 602, a memory 604, an Input/Output device 606, a data storage 612, and a network interface 610, coupled to each other via a bus 608. The components perform their conventional functions known in the art and provide the means for implementing an embodiment of the invention. For example, the network interface 610 may include the physical ports of the switches, the processor 602 may process the abstraction of the logical domain, the memory 604 and data storage 612 may store data and instructions such information about the logical domain, including logical ports, the domain identification numbers, and the predetermined criteria for determining which logical link to block. Collectively, these components represent a broad category of hardware systems, including but not limited to general purpose computer systems and specialized packet forwarding devices. It is to be appreciated that various components of computer system 600 may be rearranged, and that certain implementations of the present invention may not require nor include all of the above components. Furthermore, additional components may be included in system 600, such as additional processors (e.g., a digital signal processor), storage devices, memories, and network or communication interfaces.

As will be appreciated by those skilled in the art, the content for implementing an embodiment of the invention, for example, computer program instructions, may be provided by any machine-readable media which can store data that is accessible by network 100, as part of or in addition to memory, including but not limited to cartridges, magnetic cassettes, flash memory cards, digital video disks, random access memories (RAMs), read-only memories (ROMs), and the like. In this regard, the network 100 is equipped to communicate with such machine-readable media in a manner well-known in the art.

It will be further appreciated by those skilled in the art that the content for implementing an embodiment of the invention may be provided to the network 100 from any external device capable of storing the content and communicating the content to the network 100. For example, in one embodiment, the network 100 may be connected to another network, and the content may be stored on any device in the other network.

The above description of illustrated embodiments of the invention, including what is described in the abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method comprising:
   receiving messages from at least two inter-domain switches, wherein each switch is a member of at least one virtual local area network and a plurality of physical loop free network topology domains;
   abstracting a logical domain, wherein the logical domain comprises the inter-domain switches and at least one logical link that connects the inter-domain switches, each logical link representing one of the plurality of physical loop free network topology domains; and
   eliminating loops formed by the logical links in the logical domain.

2. The method of claim 1, wherein eliminating loops formed by the logical links in the logical domain comprises running a Spanning Tree Protocol on the logical domain.

3. The method of claim 1, wherein abstracting the logical domain further comprises mapping a logical port of the logical domain to a physical port associated with the same inter-domain switch and the same loop-free network topology domain.

4. The method of claim 3, wherein mapping a logical port of the logical domain to a physical port comprises mapping a logical port of the logical domain to a physical port based on the forwarding path from the inter-domain switch that the logical port belongs to another connecting inter-domain switch.

5. The method of claim 3, wherein eliminating loops formed by the logical links in the logical domain comprises blocking one or more logical ports.

6. The method of claim 5, wherein abstracting the logical domain further comprises flooding messages through the physical loop-free network topology domains to determine the logical ports to be blocked.

7. The method of claim 5, further comprising blocking the physical ports that are mapped to the blocked logical ports.

8. The method of claim 1, wherein eliminating loops formed by the logical links in the logical domain further comprises determining which logical link to block based on a predetermined criteria when more than one logical link may be blocked to break a loop.

9. The method of claim 8, wherein each loop-free network topology domain is assigned an identification number and determining which logical link to block based on a predetermined criteria comprises determining which logical link to block based on which loop-free network topology domain has the higher identification number.

10. The method of claim 1, wherein the physical loop free network topology domains are maintained loop free in accordance with a Spanning Tree Protocol.

11. The method of claim 1, wherein the physical loop free network topology domains are maintained loop free in accordance with an Ethernet Automatic Protection Switching Protocol.

12. A network comprising:
a plurality of physical loop free network topology domains;
inter-domain switches, wherein each inter-domain switch is a member of at least two of the plurality of physical loop free network topology domains; and
a logical domain abstracted from the inter-domain switches and logical links connecting the inter-domain switches, wherein each logical link represents one of the plurality of physical loop free network topology domains.

13. The network of claim 12, wherein the logical domain is a loop free domain achieved in accordance with a Spanning Tree Protocol.

14. The network of claim 12, wherein the inter-domain switches include at least one physical port and the logical domain includes at least one logical port, wherein each logical port is mapped to a physical port associated with the same loop-free network topology domain.

15. The network of claim 12, wherein the physical loop free network topology domains are maintained loop free in accordance with a Spanning Tree Protocol.

16. The network of claim 12, wherein the physical loop free network topology domains are maintained loop free in accordance with an Ethernet Automatic Protection Switching Protocol.

17. An article of manufacture comprising:
a machine accessible medium including content that when accessed by a machine causes the machine to:
receive messages from at least two inter-domain switches, wherein each switch is a member of at least one virtual local area network and a plurality of physical loop free network topology domains;
abstract a logical domain, wherein the logical domain comprises the inter-domain switches and at least one logical link that connects the inter-domain switches, each logical link representing one of the plurality of physical loop free network topology domains; and
eliminate loops formed by the logical links in the logical domain.

18. The article of manufacture of claim 17, wherein a machine accessible medium comprising content that when accessed by a machine causes the machine to eliminate loops formed by the logical links in the logical domain comprises a machine accessible medium comprising content that when accessed by a machine causes the machine to run a Spanning Tree Protocol on the logical domain.

19. The article of manufacture of claim 17, wherein a machine accessible medium comprising content that when accessed by a machine causes the machine to abstract a logical domain further comprises a machine accessible medium comprising content that when accessed by a machine causes the machine to map a logical port of the logical domain to a physical port associated with the same inter-domain switch and the same loop free network topology domain.

20. The article of manufacture of claim 19, wherein a machine accessible medium comprising content that when accessed by a machine causes the machine to eliminate loops formed by the logical links in the logical domain comprises a machine accessible medium comprising content that when accessed by a machine causes the machine to block one or more logical ports.

21. The article of manufacture of claim 20, further comprising a machine accessible medium comprising content that when accessed by a machine causes the machine to block the physical ports that are mapped to the blocked logical ports.

22. The article of manufacture of claim 17, wherein the physical loop free network topology domains are maintained loop free in accordance with a Spanning Tree Protocol.

23. The article of manufacture of claim 17, wherein the physical loop free network topology domains are maintained loop free in accordance with an Ethernet Automatic Protection Switching Protocol.

* * * * *